(12) United States Patent
Imamura (10) Patent No.: US 10,144,449 B2
(45) Date of Patent: Dec. 4, 2018

(54) ELECTRIC POWER STEERING APPARATUS (71) Applicant: NSK LTD., Tokyo (JP)

(72) Inventor: Yukihiro Imamura, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/100,053

(22) PCT Filed: Jun. 15, 2015

(86) PCT No.: PCT/JP2015/067186
§ 371 (c)(1),
(2) Date: May 27, 2016

(87) PCT Pub. No.: WO2016/051884
PCT Pub. Date: Apr. 7, 2016

(65) Prior Publication Data
US 2018/0194389 A1 Jul. 12, 2018

(30) Foreign Application Priority Data

Oct. 1, 2014 (JP) .................................. 2014-203250
Oct. 1, 2014 (JP) .................................. 2014-203251

(51) Int. Cl.
*B62D 5/04* (2006.01)
*B62D 15/02* (2006.01)

(52) U.S. Cl.
CPC ......... *B62D 5/0469* (2013.01); *B62D 5/0409* (2013.01); *B62D 5/0463* (2013.01); *B62D 15/0215* (2013.01)

(58) Field of Classification Search
CPC .. B62D 5/0469; B62D 5/0463; B62D 5/0409; B62D 15/0215
See application file for complete search history.

(56) References Cited

U.S. PATENT DOCUMENTS 4,727,950 A * 3/1988 Shimizu ............... B62D 5/0469
180/446
4,785,901 A * 11/1988 Maeda ................. B62D 5/0469
180/444
(Continued)

FOREIGN PATENT DOCUMENTS

EP 1 167 158 A1 1/2002
JP 61-184171 A 8/1986
(Continued)

OTHER PUBLICATIONS

International Search Report of PCT/JP2015/067186, dated Jul. 7, 2015. [PCT/ISA/210].
(Continued)

*Primary Examiner* — Russell Frejd
(74) *Attorney, Agent, or Firm* — Sughrue Mion, PLLC (57) ABSTRACT

An electric power steering apparatus that calculates a current command value based on at least a steering torque and assist-controls a steering system by driving a motor based on the current command value, the apparatus having a function to detect a steering angle on a steering and includes a gain section having a gain characteristic that a gain changes corresponding to the steering angle, such that a new current command value is generated by multiplying the current command value with the gain outputted from the gain section corresponding to the steering angle, and the gain characteristic is a constant value "1.0" till a steering angle $\theta 1$ short of a rack end, gradually decreases till a steering angle $\theta 2$ ($>\theta 1$) exceeding the rack end and holds a constant value G ($>0$) in a region that the steering angle is equal to or more than the steering angle $\theta 2$.

6 Claims, 8 Drawing Sheets

(56) References Cited

U.S. PATENT DOCUMENTS

| | | | | |
|---|---|---|---|---|
| 5,086,859 | A | * | 2/1992 | Takahashi ............ B62D 5/0469 180/446 |
| 7,308,964 | B2 | * | 12/2007 | Hara ...................... B62D 1/163 180/402 |
| 2014/0188337 | A1 | | 7/2014 | Pyo |

FOREIGN PATENT DOCUMENTS

| | | | |
|---|---|---|---|
| JP | 2001-253356 | A | 9/2001 |
| JP | 4132439 | B2 | 8/2008 |
| JP | 2011-126477 | A | 6/2011 |
| JP | 2012224258 | A | 11/2012 |

OTHER PUBLICATIONS

Written Opinion of PCT/JP2015/067186, dated Jul. 7, 2015. [PCT/ISA/237].

\* cited by examiner

FIG.1

PRIOR ART

FIG.2

PRIOR ART

ELECTRIC POWER STEERING APPARATUS

CROSS REFERENCE TO RELATED APPLICATIONS

This application is a National Stage of International Application No. PCT/JP2015/067186 filed Jun. 15, 2015, claiming priority based on Japanese Patent Application Nos. 2014-203250, filed Oct. 1, 2014, and 2014-203251, filed Oct. 1, 2014, the contents of all of which are incorporated herein by reference in their entirety.

TECHNICAL FIELD

The present invention relates to an electric power steering apparatus that calculates a current command value based on at least a steering torque, drives a motor based on the current command value and applies an assist force to a steering system of a vehicle by the motor driving, and in particular to an electric power steering apparatus that controls the steering system by multiplying a gain changing corresponding to the steering angle (absolute steering angle) with the current command value or assist-controls the steering system with a new current command value obtained by upper-clipping the target current limit-value changing corresponding to the steering angle (absolute steering angle), thereby to reduce the steering torque by stopping the current command value near a rack end, to abate a shock energy by attenuating the power of at a time of an end hitting, to suppress a hitting sound that a driver feels uncomfortable and to improve the steering feeling of the driver.

BACKGROUND ART

An electric power steering apparatus (EPS) that energizes a steering system of a vehicle by using a rotational torque of a motor as an assist torque, applies an assist force of the motor as the assist torque to a steering shaft or a rack shaft by means of a transmission mechanism such as gears or a belt through a reduction mechanism. In order to accurately generate the assist torque (steering assist torque), such a conventional electric power steering apparatus performs a feedback control of a motor current. The feedback control adjusts a voltage supplied to the motor so that a difference between a current command value and a motor current becomes small, and the adjustment of the voltage applied to the motor is generally performed by an adjustment of a duty ratio of a pulse width modulation (PWM) control.

Figure 1:
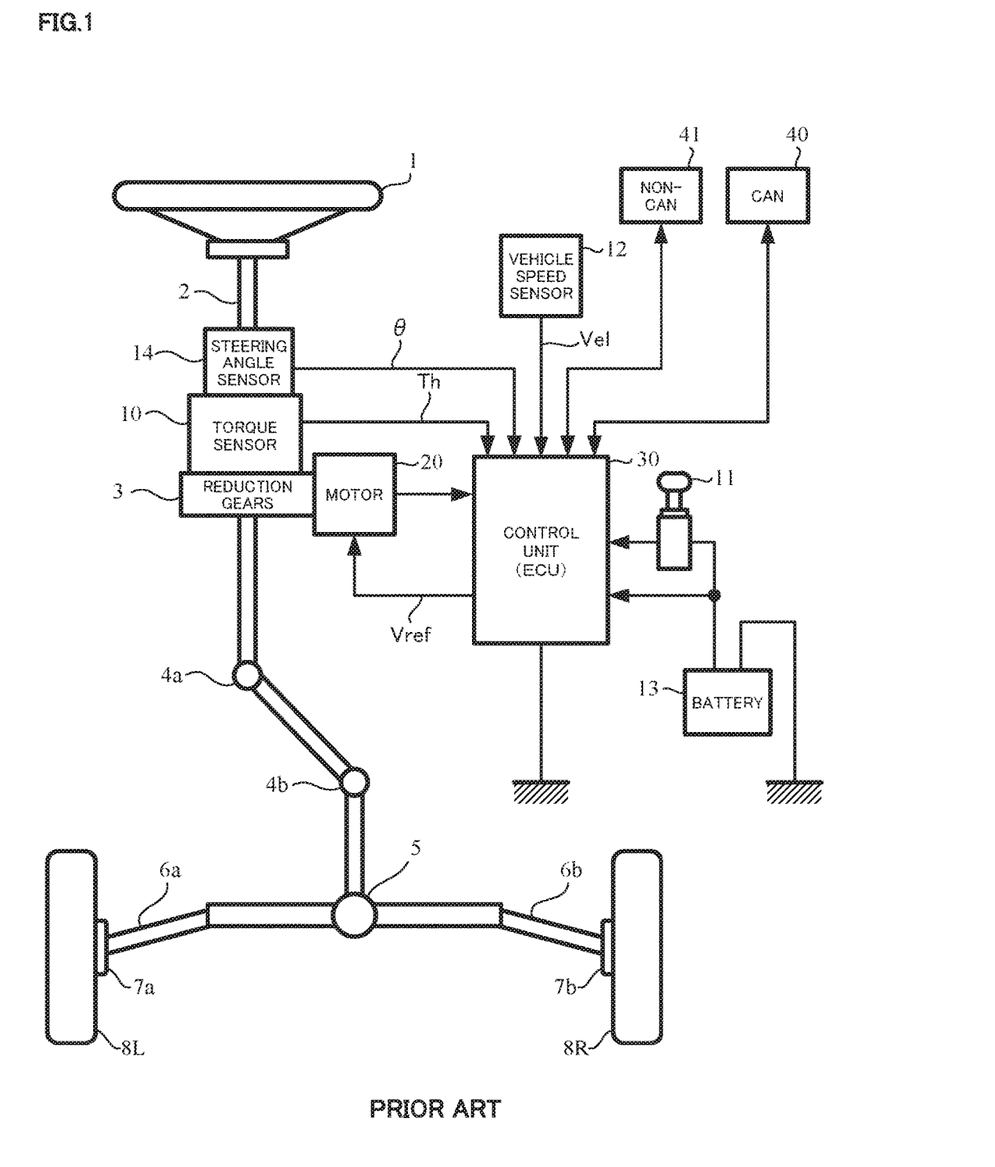
FIG. 1 is a diagram illustrating a constitution example of a general electric power steering apparatus.

A general constitution of a conventional electric power steering apparatus will be described with reference to FIG. 1. As shown in FIG. 1, a column shaft (a steering shaft, handle shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Th of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command based on the steering torque Th detected by the torque sensor 10 and a vehicle speed Vel detected by a vehicle speed sensor 12, and controls a current supplied to the motor 20 based on a voltage command value Vref obtained by performing a compensation and so on with respect to the calculated current command value.

A controller area network (CAN) 40 to send/receive various information and signals on the vehicle is connected to the control unit 30, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

Figure 2:
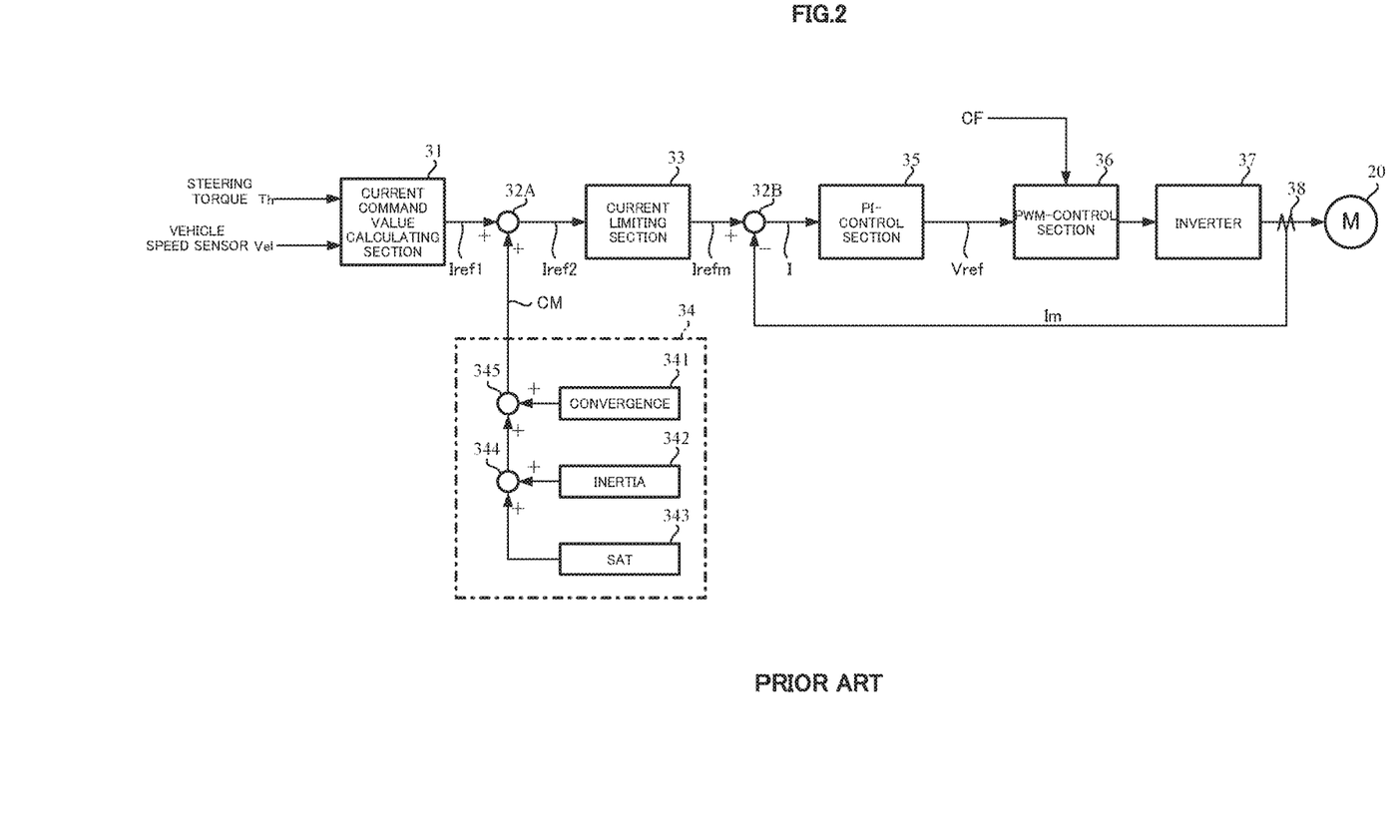
FIG. 2 is a block diagram showing an example of a control system of the electric power steering apparatus.

The control unit 30 mainly comprises a CPU (or an MPU or an MCU), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 are inputted into a current command value calculating section 31. The current command value calculating section 31 calculates a current command value Iref1 based on the steering torque Th and the vehicle speed Vel. The calculated current command value Iref1 is inputted into an adding section 32A and is added with a compensation signal CM from a compensating section 34 for improving a current characteristic. The maximum value of the added current command value Iref2 is limited at a current limiting section 33, a current command value Irefm that is limited the maximum current, is inputted into a subtracting section 32B, and a motor current detected-value Im is subtracted from the current command value Irefm.

A deviation I (=Irefm−Im) being a subtraction result at the subtracting section 32 is inputted into a PI-control section 35, the PI-controlled voltage command value Vref is inputted into a PWM-control section 36 and is calculated duty ratios in synchronous with a carrier signal CF, and the motor 20 is PWM-driven through an inverter 37 with PWM-signals. The motor current value Im of the motor 20 is detected by a motor current detector 38 and is fed back to the subtracting section 32B.

The compensating section 34 adds a self-aligning torque (SAT) 343 detected or estimated with an inertia 342 at an adding section 344, further adds the result of addition performed at the adding section 344 with a convergence 341 at an adding section 345, and then outputs the result of addition performed at the adding section 345 as the compensation signal CM thereby to improve the characteristic of the current command value. In addition to the compensating section 34, although there are many cases to provide a vibration-damping control section to suppress the vibration of the steering wheel, these the compensating section and the vibration-damping control section are not indispensable.

According to an exemplary embodiment of an electric power steering apparatus, if a great assist torque is applied by the motor near the maximum steering angle (rack end) of the steering system, a great shock occurs when the steering system reaches at the maximum steering angle and the hitting sound is generated. In this way, a driver feels uncomfortable, and there is a possibility to lock the steering system including the motor.

In this connection, Japanese Published Unexamined Patent Application No. S61-184171 (Patent Document 1) discloses the electric power steering apparatus to decrease the assist torque of the motor when the steering angle is equal to or more than a predetermined angle or to interrupt the application of the assist torque. Patent Document 1 also discloses the electric power steering apparatus not to occur the assist torque at the time.

Further, Japanese Published Unexamined Patent Application No. 2001-253356 (Patent Document 2) discloses the electric power steering apparatus provided an unloader correcting section to correct the steering torque of the motor corresponding to the steering velocity when the steering angle exceeds a predetermined angle near the maximum angle.

THE LIST OF PRIOR ART DOCUMENTS

Patent Documents

Patent Document 1: Japanese Published Unexamined Patent Application No. S61-184171 A1
Patent Document 2: Japanese Published Unexamined Patent Application No. 2001-253356 A1

SUMMARY OF THE INVENTION

Problems to be Solved by the Invention

However, the electric power steering apparatus disclosed in Patent Document 1 does not show a characteristic to decrease the assist torque of the motor when the steering angle exceeds the predetermined angle. Although the electric power steering apparatus disclosed in Patent Document 2 decreases the steering torque when the steering angle exceeds a predetermined angle near the maximum angle, the steering velocity is used. Further, since both the electric power steering apparatuses interrupt the application of the assist torque at the end hitting time, the driver feels the uncomfortable steering.

The present invention has been developed in view of the above-described circumstances, and an object of the present invention is to provide an electric power steering apparatus that abates the shock energy with an attenuation of the power at the end hitting time by stopping the current command value near the rack end, does not give the uncomfortable feeling to the driver and suppresses the hitting sound.

Means for Solving the Problems

The present invention relates to an electric power steering apparatus that calculates a current command value based on at least a steering torque and assist-controls a steering system by driving a motor based on said current command value, the above-described object of the present invention is achieved by that:
wherein said electric power steering apparatus has a function to detect a steering angle on a steering and comprises a gain section having a gain characteristic that a gain changes corresponding to said steering angle; wherein a new current command value is generated by multiplying said current command value with said gain outputted from said gain section corresponding to said steering angle; and said gain characteristic is a constant value "1.0" till a steering angle $\theta 1$ short of a rack end of said steering, gradually decreases till a steering angle $\theta 2$ ($>\theta 1$) exceeding said rack end and holds a constant value G ($>0$) in a region that said steering angle is equal to or more than said steering angle $\theta 2$,
or
wherein said electric power steering apparatus has a function to detect a steering angle on a steering and comprises a target current limit-value calculating section having a target current limit-value characteristic that a target current limit-value changes corresponding to said steering angle; wherein a new current command value for said current command value is obtained by upper-clipping said target current limit-value outputted from said target current limit-value calculating section corresponding to said steering angle; and said target current limit-value characteristic is a constant value TL1 till a steering angle $\theta 10$ short of a rack end of said steering, gradually decreases till a steering angle $\theta 11$ ($>\theta 10$) exceeding said rack end and holds a constant value TL2 ($>0$) in a region that said steering angle is equal to or more than said steering angle $\theta 11$.

Further, the above-described object of the present invention is more effectively achieved by that; wherein said rack end is a middle of said steering angle $\theta 1$ and said steering angle $\theta 2$, or wherein a decreasing of said gain is a linear characteristic, or wherein a decreasing of said gain is a non-linear characteristic.

Effects of the Invention

The electric power steering apparatus according to the present invention controls the steering system by multiplying a gain changing corresponding to the steering angle (absolute steering angle) with the current command value or assist-controls the steering system with a new current command value obtained by upper-clipping the target current limit-value changing corresponding to the steering angle (absolute steering angle), thereby to reduce the steering torque by stopping the current command value near the rack end, to abate the shock energy by attenuating the power at a time of the end hitting. Consequently, it is possible to suppress the hitting sound that the driver feels uncomfortable. Further, since the gain does not become "0" even if the steering angle exceeds the rack end, the driver does not feel the uncomfortable steering.

BRIEF DESCRIPTION OF THE DRAWINGS

In the accompanying drawings.

MODE FOR CARRYING OUT THE INVENTION

The present invention suppresses a hitting sound (a shock sound between a rack and a rack end) that a driver feels uncomfortable, without giving a steering uncomfortable feeling to the driver. Especially, the present invention suppresses the hitting sound at an end hitting of a super low speed time (a static state~about 0~5 km/h of a creep).

In this connection, in the first embodiment of the present invention, a predetermined steering angle (θ1) short of the rack end and a predetermined steering angle (θ2) in a region exceeding the rack end are set in advance, a gain (GS) decreases to a constant value (G) (less than "1.0" and more than "0") between the predetermined value (θ1) and the predetermined value (θ2) of the handle steering angle (absolute steering angle) and holds the constant value (G) in a region where the handle steering angle (absolute steering angle) is equal to or more than the predetermined value (θ2). Then, the first embodiment assist-controls the steering system based on a new current command value (target current value) which is obtained by multiplying a separately-calculated current command value with the gain (GS) decreasing corresponding to the handle steering angle.

Further, in the second embodiment of the present invention, a predetermined steering angle (θ10) short of the rack end and a predetermined steering angle (θ11) in a region exceeding the rack end are set in advance, a target current limit-value (TL) is decreased from a constant value TL1 to a constant value TL2 (>0) between the predetermined value (θ10) and the predetermined value (θ11) of the handle steering angle (absolute steering angle) and the target current limit-value TL2 of the constant value is held in a region where the handle steering angle (absolute steering angle) is equal to or more than the predetermined value (θ11). Then, the second embodiment assist-controls the steering system based on a new current command value (target current value) which is obtained by upper-clipping the target current limit-value (TL) decreasing corresponding to the handle steering angle.

That is, the present invention is the electric power steering apparatus having the motor to generate the assist torque corresponding to the steering torque of the steering system, and the electric power steering apparatus judges whether the handle steering angle (absolute steering angle) of the steering system becomes short of the predetermined value for the maximum steering angle (rack end) or not, and decreases the assist torque to a value (is not "0") by decreasing the current command value inputting to the motor when the steering angle becomes short (this side) of the maximum steering angle by a predetermined value.

In the first embodiment, the handle steering angle (absolute steering angle) at the actual rack end is set so as to be a middle of two predetermined values (θ1, θ2) becoming inflection points of the gain (GS). This reason is that the steering uncomfortable feeling of the driver occurs if the gain at the end hitting time is set at the inflection point. Occurring of the steering uncomfortable feeling is prevented without setting "0" of the gain (GS). Further, in the second embodiment, the handle steering angle (absolute steering angle) at the actual rack end is set so as to be a middle of two predetermined values (θ10, θ11) becoming inflection points of the target current limit-value (TL). This reason is that the steering uncomfortable feeling of the driver occurs if the target current limit-value at the end hitting time is set at the inflection point. Occurring of the steering uncomfortable feeling is prevented without setting "0" of the target current limit-value (TL).

Hereinafter, embodiments of the present invention will be described with reference to the accompanying drawings.

Figure 3:
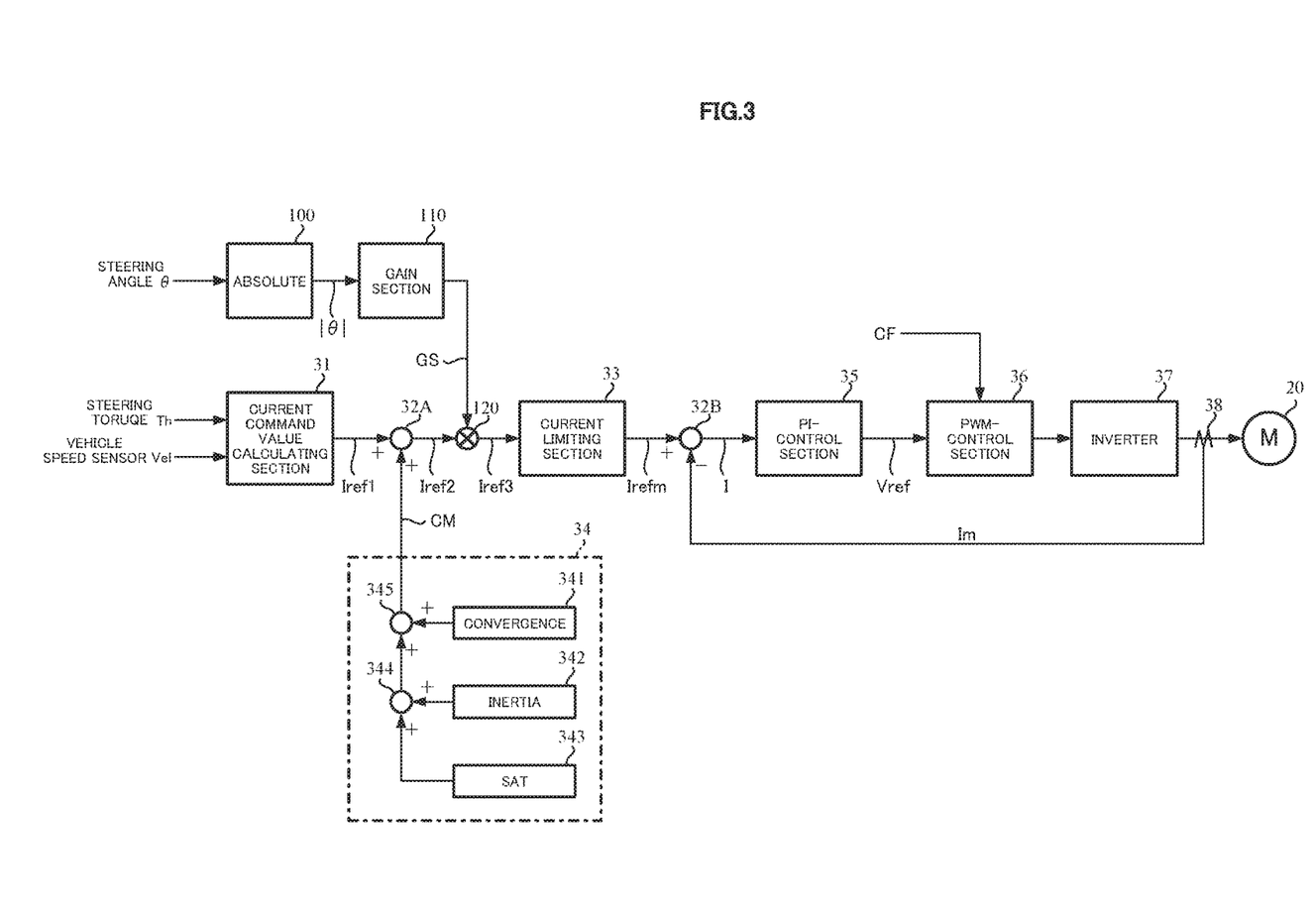
FIG. 3 is a block diagram showing a constitution example (the first embodiment) of electric power steering apparatus according to the present invention.

FIG. 3 shows a constitution example of the first embodiment of the present invention corresponding to FIG. 2. As shown in FIG. 3, the first embodiment is provided with an absolute-value section 100 to obtain an absolute steering angle |θ| which is an absolute value of the steering angle θ, a gain section 110 having a gain characteristic of which gain GS changes in correspondence with the absolute steering angle |θ| and a multiplying section 120 to obtain a new current command value Iref3 by multiplying the current command value Iref2 with the gain GS.

Figure 4:
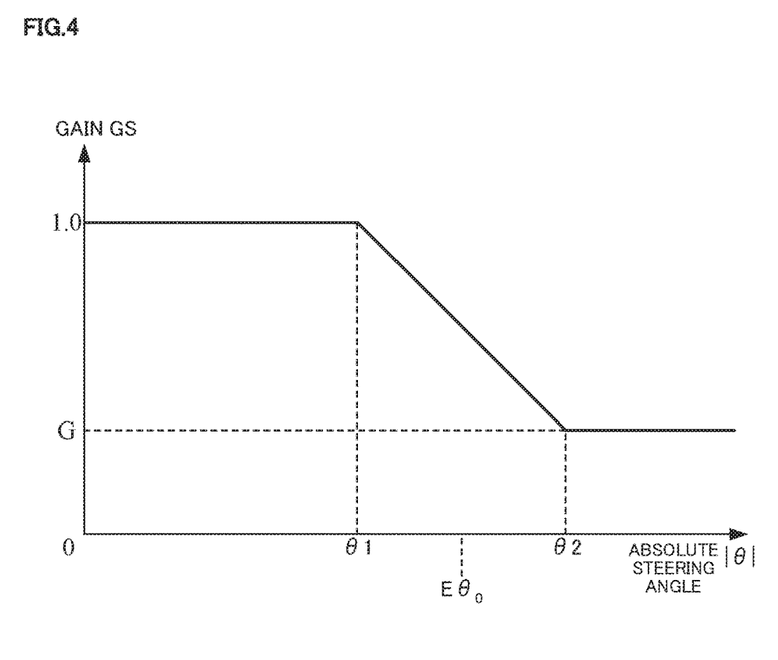
FIG. 4 is a diagram showing a characteristic example (linear) of a gain section.

The gain characteristic of the gain section 110 is shown, for example, in FIG. 4. Namely, in FIG. 4, the absolute steering angle θ1 is set at front (short) for the rack end $E\theta_0$, the absolute steering angle θ2 (>θ1) is set at rear and the rack end $E\theta_0$ is a middle of the absolute steering angle θ1 and the absolute steering angle θ2. Then, the gain GS is a constant value "1.0" from the steering angle "0" to the absolute steering angle θ1 short of the rack end $E\theta_0$, and the gain GS linearly decreases to the gain G (is not "0" and more than "0") after reaching at the absolute steering angle θ1 till the absolute steering angle θ2 exceeding the rack end $E\theta_0$. Further, the gain GS is held to the constant gain G in a region exceeding the absolute steering angle θ2.

In such a constitution, the steering angle θ is inputted into the absolute-value section 100 and the absolute steering angle |θ| is obtained, and then the absolute steering angle |θ| is inputted into the gain section 110. The gain section 110 outputs the gain GS corresponding to the inputted absolute steering angle |θ| with the gain characteristic as shown in FIG 4. The gain GS is inputted into the multiplying section 120, a new current command value Iref3 (=Iref2×GS) being multiplied by the current command value Iref2 with the gain GS is generated at the multiplying section 120, and the assist control as stated above is performed based on the current command value Iref3.

As stated above, the present invention controls the steering system by multiplying the current command value Iref2 with the gain GS changing in correspondence with the absolute steering angle |θ|, reduces the steering torque by stopping the current command value near (θ1~θ2) of the rack end (Eθ0), and lowers the shock energy by attenuating the power at the end hitting time. In this way, it is possible to suppress the hitting sound that makes the driver feel uncomfortable. Further, since the gain G in the region the steering angle θ exceeds the absolute steering angle θ2 is greater than "0" and is not "0", the uncomfortable steering feeling of the driver does not occur.

Figure 5:
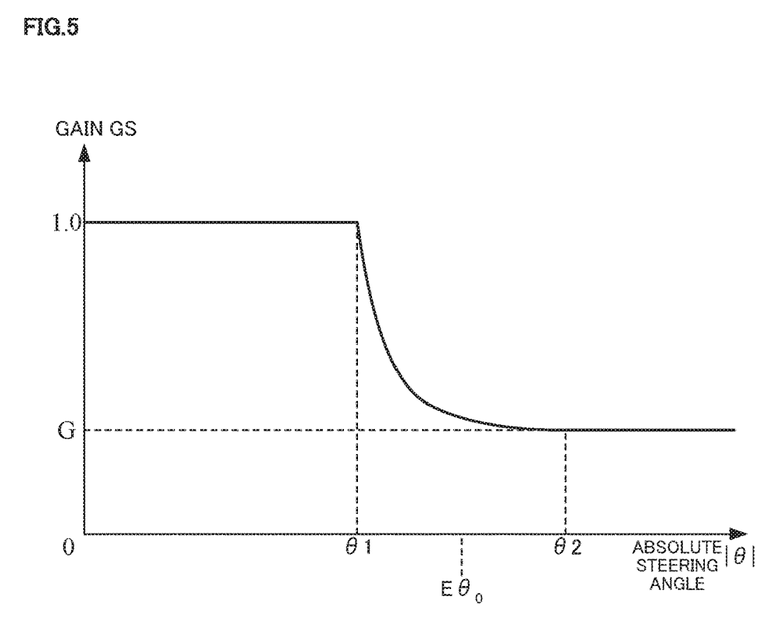
FIG. 5 is a characteristic example (non-linear) of a gain section.
Figure 6:
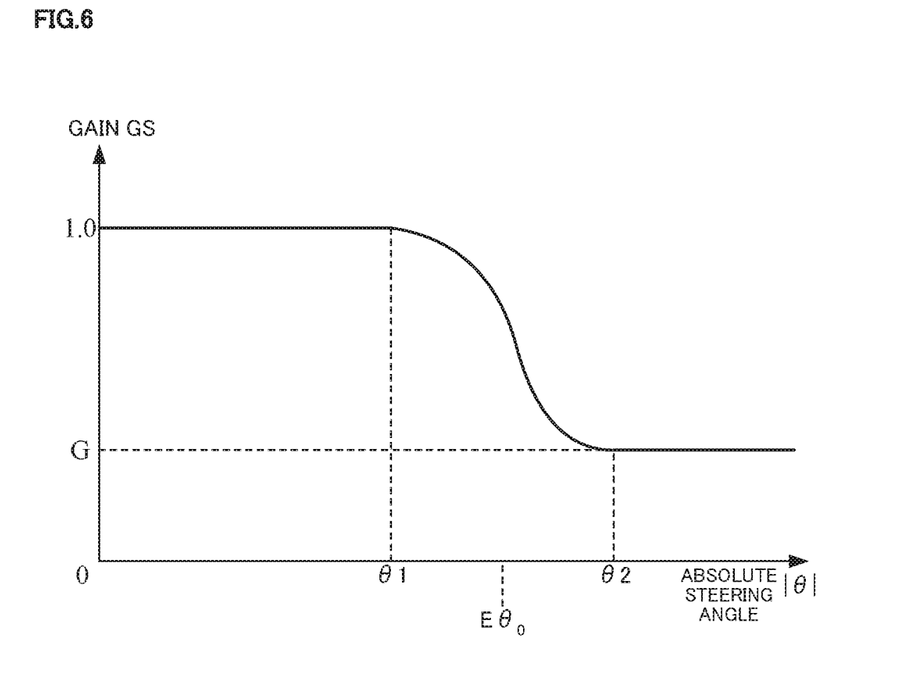
FIG. 6 is a characteristic example (non-linear) of a gain section.

In the above first embodiment, although the decreasing characteristic of the gain GS is linearly performed as shown in FIG. 4, it may decrease the gain GS with a non-linear parabolic characteristic as sown in FIG. 5 or with a S-letter characteristic as sown in FIG. 6. In the case of FIG. 6, the steering feeling given to the driver is more smoothed.

Furthermore, in the first embodiment, although the gain changes based on the predetermined steering angles θ1 and θ2 across the rack end are determined by using the absolute-value of the steering angle, it is possible to set predetermined steering angles ±θ1 and ±θ2 for the plus and minus steering angles without using the absolute-value and to change the gain in the plus and minus regions of the steering angle.

Next, the second embodiment of the present invention will be described with reference to FIG. 7.

Figure 7:
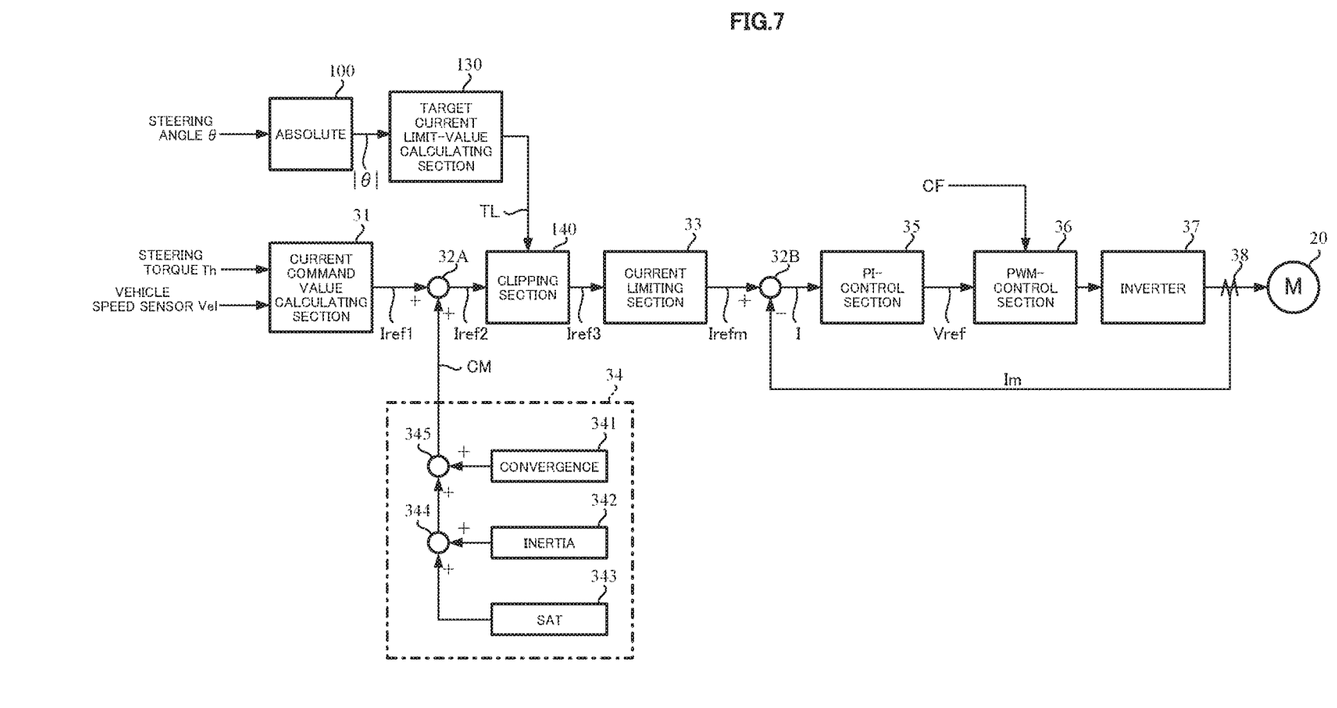
FIG. 7 is a block diagram showing a constitution example (the second embodiment) of electric power steering apparatus according to the present invention.

As shown in FIG. 7, the second embodiment is provided with a target current limit-value calculating section 130 having a target current limit-value characteristic of which a target current limit-value TL changes in correspondence with the absolute steering angle |θ| from the absolute-value section 100 and a clipping section 140 to get a new current command value Iref3 by upper-clipping the target current limit-value TL for the current command value Iref2.

Figure 8:
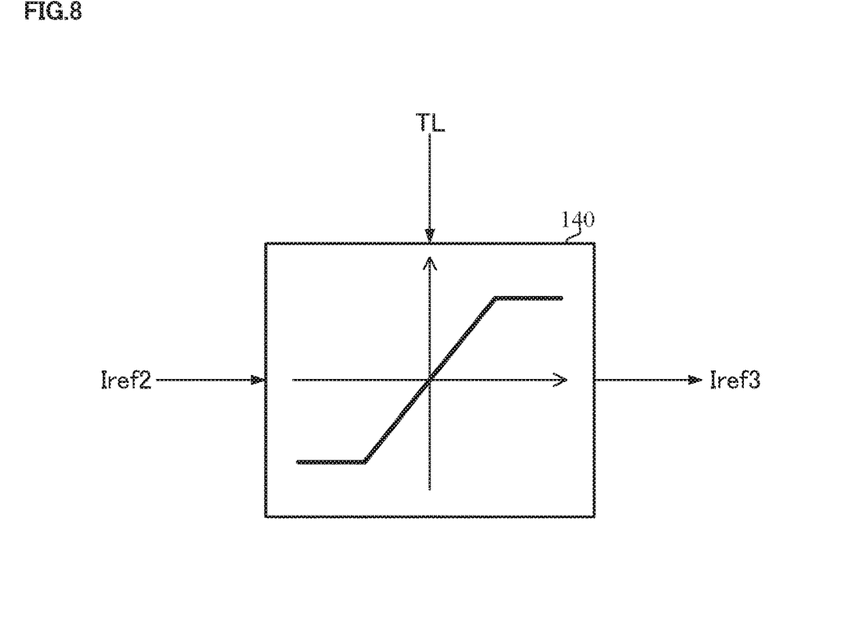
FIG. 8 is a diagram showing a relation among signals in a clipping section.

An input/output relation in the clipping section 140 is shown in FIG. 8 and a new current command value Iref3 is generated by upper-clipping the target current limit-value TL.

Figure 9:
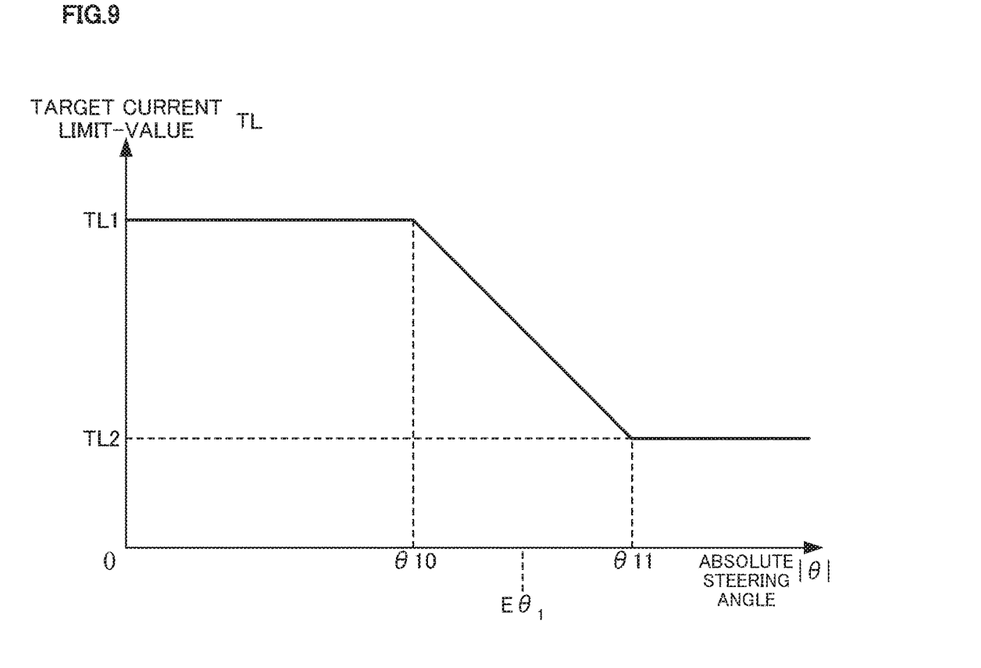
FIG. 9 is a characteristic example (linear) of a gain section.

The target current limit-value characteristic of the target current limit-value calculating section 140 is shown, for example, in FIG. 9. Namely, in FIG. 9, the absolute steering angle θ10 is set at front (short) for the rack end $E\theta_1$, the absolute steering angle θ11 (>θ10) is set at rear and the rack end $E\theta_1$ is a middle of the absolute steering angle θ10 and the absolute steering angle θ11. Then, the target current limit-value TL is a constant value TL1 from the steering angle "0" to the absolute steering angle θ10 short of the rack end $E\theta_1$, and the target current limit-value TL linearly decreases to the target current limit-value TL2 (is not "0" and more than "0") after reaching at the absolute steering angle θ10 till the absolute steering angle θ11 exceeding the rack end $E\theta_1$. Further, the target current limit-value TL is held to the constant target current limit-value TL2 in a region exceeding the absolute steering angle θ11.

In such a constitution, the steering angle θ is inputted into the absolute-value section 100 and the absolute steering angle |θ| is obtained, and then the absolute steering angle |θ| is inputted into the target current limit-value calculating section 130. The target current limit-value calculating section 130 outputs the target current limit-value TL corresponding to the inputted absolute steering angle |θ| with the target current limit-value characteristic as shown in FIG. 9. The target current limit-value TL is inputted into the clipping section 140, a new current command value Iref3 which is clipped the current command value Iref2 with the target current limit-value TL is generated at the clipping section 140, and the assist control as stated above is performed based on the current command value Iref3.

As stated above, the present invention controls the steering system by upper-clipping the target current limit-value TL changing in correspondence with the absolute steering angle |θ|, reduces the steering torque by stopping the current command value near (θ10~θ11) of the rack end ($E\theta_1$), and abates the shock energy by attenuating the power at the end hitting time. In this way, it is possible to suppress the hitting sound that the driver feels uncomfortable. Further, since the target current limit-value TL2 held in the region exceeding the absolute steering angle θ11 is greater than "0" and is not "0", the uncomfortable steering feeling of the driver also does not occur.

Figure 10:
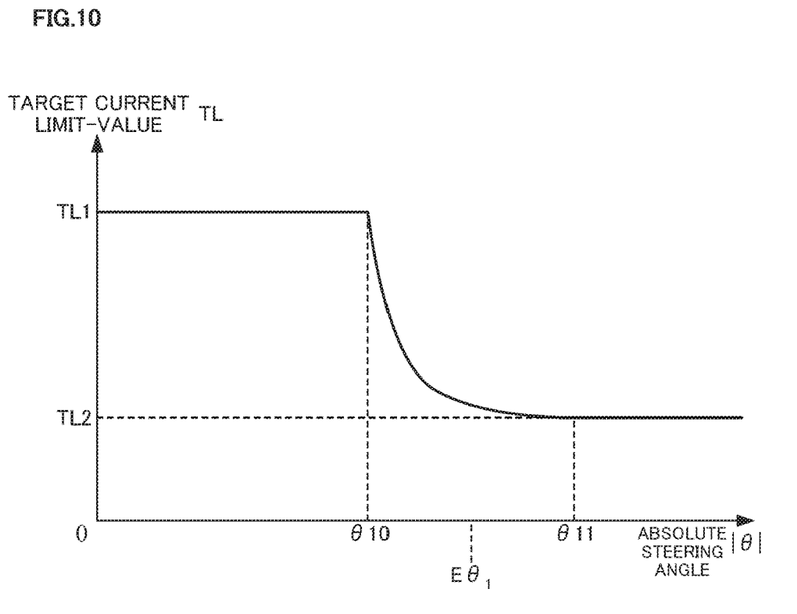
FIG. 10 is a characteristic example (non-linear) of a gain section.
Figure 11:
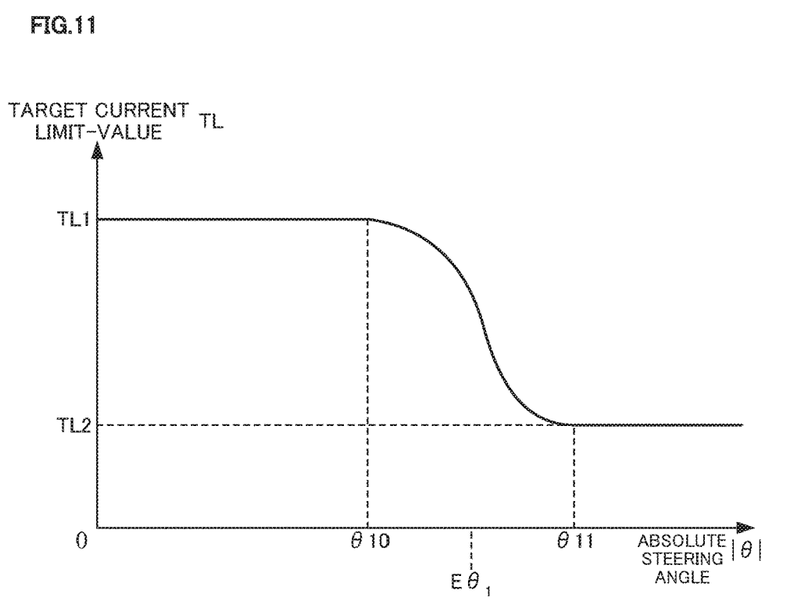
FIG. 11 is a characteristic example (non-linear) of a gain section.

In the above second embodiment, although the decreasing characteristic of the target current limit-value TL is linearly performed as shown in FIG. 9, it may decrease the target current limit-value TL with a non-linear parabolic characteristic as sown in FIG. 10 or with a S-letter characteristic as sown in FIG. 11. In the case of FIG. 11, the steering feeling given to the driver is more smoothed.

Furthermore, in the above second embodiment, although the target current limit-value changes based on the predetermined steering angles θ10 and θ11 putting the rack end into before and behind by the absolute-value doing of the steering angle, it is possible to set predetermined steering angles ±θ10 and ±θ11 for the plus and minus steering angles without the absolute-value doing and to change the target current limit-value in the plus and minus regions of the steering angle.

EXPLANATION OF REFERENCE NUMERALS 1 handle
2 column shaft (steering shaft, handle shaft)
10 torque sensor
12 vehicle speed sensor
11 ignition key
13 battery
20 motor
23 motor driving section
30 control unit (ECU)
31 current command value calculating section
35 PI-control section
36 PWM-control section
100 absolute-value section
110 gain section
120 multiplying section
130 target current limit-value calculating section
140 clipping section

The invention claimed is:

1. An electric power steering apparatus that calculates a current command value based on at least a steering torque and assist-controls a steering system by driving a motor based on said current command value:
    wherein said electric power steering apparatus has a function to detect a steering angle on a steering and comprises a gain section having a gain characteristic that a gain changes corresponding to said steering angle;
    wherein a new current command value is generated by multiplying said current command value with said gain outputted from said gain section corresponding to said steering angle;
    said gain characteristic is a constant value "1.0" till a steering angle θ1 short of a rack end of said steering, gradually decreases till a steering angle θ2 (>θ1) exceeding said rack end and holds a constant value G (>0) in a region that said steering angle is equal to or more than said steering angle θ2; and
    wherein said rack end is a middle of said steering angle θ1 and said steering angle θ2.

2. The electric power steering apparatus according to claim 1, wherein a decreasing of said gain is a linear characteristic.

3. The electric power steering apparatus according to claim 1, wherein a decreasing of said gain is a non-linear characteristic.

4. An electric power steering apparatus that calculates a current command value based on at least a steering torque and assist-controls a steering system by driving a motor based on said current command value:
    wherein said electric power steering apparatus has a function to detect a steering angle on a steering and comprises a target current limit-value calculating section having a target current limit-value characteristic that a target current limit-value changes corresponding to said steering angle;
    wherein a new current command value for said current command value is obtained by upper-clipping said target current limit-value outputted from said target current limit-value calculating section corresponding to said steering angle;
    said target current limit-value characteristic is a constant value TL1 till a steering angle θ10 short of a rack end of said steering, gradually decreases till a steering angle θ11 (>θ10) exceeding said rack end and holds a constant value TL2 (>0) in a region that said steering angle is equal to or more than said steering angle θ11; and
    wherein said rack end is a middle of said steering angle θ10 and said steering angle θ11.

5. The electric power steering apparatus according to claim 4, wherein a decreasing of said target current limit-value is a linear characteristic.

6. The electric power steering apparatus according to claim 4, wherein a decreasing of said target current limit-value is a non-linear characteristic.

* * * * *